US008782390B2

(12) United States Patent
Haaf

(10) Patent No.: US 8,782,390 B2
(45) Date of Patent: Jul. 15, 2014

(54) CONTROL UNIT FOR FLUIDIC SYSTEMS

(75) Inventor: Volker Haaf, Crailsheim (DE)

(73) Assignee: Buerkert Werke GmbH, Ingelfingen (DE)

( * ) Notice: Subject to any disclaimer, the term of this patent is extended or adjusted under 35 U.S.C. 154(b) by 291 days.

(21) Appl. No.: 13/215,267

(22) Filed: Aug. 23, 2011

(65) Prior Publication Data

US 2012/0054483 A1 Mar. 1, 2012

(30) Foreign Application Priority Data

Aug. 23, 2010 (DE) ........................ 10 2010 035 102

(51) Int. Cl.
*G06F 1/24* (2006.01)
*G06F 15/177* (2006.01)
*G06F 3/00* (2006.01)

(52) U.S. Cl.
USPC .................................. 713/100; 713/1; 710/8

(58) Field of Classification Search
USPC ........................................................ 713/100
See application file for complete search history.

(56) References Cited

U.S. PATENT DOCUMENTS 5,628,028 A * 5/1997 Michelson ........................ 710/8
6,260,139 B1 * 7/2001 Alfke ................................ 713/1
6,304,101 B1 * 10/2001 Nishihara ....................... 326/41
6,658,564 B1 * 12/2003 Smith et al. .................. 713/100
6,976,118 B1 * 12/2005 Baier ........................... 711/103
7,171,548 B2 * 1/2007 Smith et al. ...................... 713/1
7,320,064 B2 * 1/2008 Ramos et al. ................ 712/226
7,576,561 B1 * 8/2009 Huang ........................... 326/38
7,589,558 B1 * 9/2009 Tseng et al. .................. 326/41

FOREIGN PATENT DOCUMENTS

DE 102007022991 A1 11/2008
WO 2008046695 A1 4/2008

OTHER PUBLICATIONS

German Search Report dated Jun. 6, 2011.

* cited by examiner

*Primary Examiner* — Suresh Suryawanshi
(74) *Attorney, Agent, or Firm* — Carlson, Gaskey & Olds, PC

(57) ABSTRACT

Diverse requirements of fluidic applications for very different communication environments are satisfied with a control unit for fluidic systems, which can be configured in an extremely flexible manner. A universal computing module is used as a unitary stock item, which includes a programmable logic module, a clock generator, a volatile fast working memory, and a persistent memory, and which is constructed with few peripheral components on a circuit board. The unitary computing module is equipped with all of the required hardware components for the respective application by configuration file, including the functionality for the respective communication environment. Moreover, a dynamic configuration by identification of communication modules connected to the circuit board is also possible. Similarly, reconfiguration in adaptation to a varied environment can be effected.

18 Claims, 3 Drawing Sheets persistent memory
34
FPGA
32
3
2
1
3: memory controller for persistent memory
2: CPU
1: instruction and variable memory of the operating software persistent memory
34
6
7
8
9
FPGA
32
1
2
3
4
5
working memory CPU 1
36a
8
working memory CPU 2
36b
9

CONTROL UNIT FOR FLUIDIC SYSTEMS

RELATED APPLICATION

This application claims priority to German application No. 10 2010 035 102.4, which was filed Aug. 23, 2010.

TECHNICAL FIELD

The invention relates to a control unit for fluidic systems.

BACKGROUND OF THE INVENTION

The designation "fluidic systems" refers to a large spread of technical devices and device combinations, which are concerned with the control, metering or measurement/analysis of fluids (liquids and gases), from simple valves or valve groups via metering or analyzing devices through to complex devices such as mass flow measuring devices. Typically, for these applications, control units require a controller, a communication interface to a superordinate control as well as interfaces for actuators and/or sensors according to application. According to communication environment, different communication interfaces are required, e.g. bus interfaces. These control units are equipped with the standard components such as micro-controllers and interfaces suitable for each application, wherein the respective application presets the selection of the used components according to capability, communication environment and costs. The variety of the control units employed in fluidic systems is correspondingly large.

SUMMARY OF THE INVENTION

The invention satisfies manifold requirements of fluidic applications for very different communication environments with an extremely flexibly configurable control unit for fluidic systems. A universal computing module is used as a unitary stock item, which includes a programmable logic module, a clock generator, a volatile fast working memory and a persistent memory, and which is constructed with few peripheral components on a circuit board. A programmable logic module, which is referred to as a FPGA (Field Programmable Gate Array), is an integrated circuit of digital technology, which can be configured to an extremely complex logical circuit by programming. Typical components of a FPGA, which can be made available as hardware by programming, are logic base blocks, processors, multiplexers, memory controllers and lookup tables, but also complete communication interfaces with I/O ports for usual standards, memories and hardware for the clock conditioning. With certain architecture, it is possible to equip the unitary computing module with all of the required hardware components for the respective application by configuration file, including the functionality for the respective communication environment. Moreover, dynamic configuration by identification of communication modules connected to the circuit board is also possible. Similarly, a reconfiguration can be effected in adaptation to a varied environment. Such a reconfiguration can be effected manually or automatically simply by plugging a communication module into the circuit board. Therefore, an existing configuration can easily be adapted to a varied communication environment at any time and even in the field by the user. The hardware components required for this are already pre-configured in persistently stored configuration files and only have to be loaded into the FPGA on demand.

Further features and advantages of the invention appear from the following description based on the attached drawings. In the drawings show:

BRIEF DESCRIPTION OF THE DRAWINGS

FIG. 3 schematically shows the initial state of the computing module upon switching on.

DETAILED DESCRIPTION OF A PREFERRED EMBODIMENT

Figure 1:
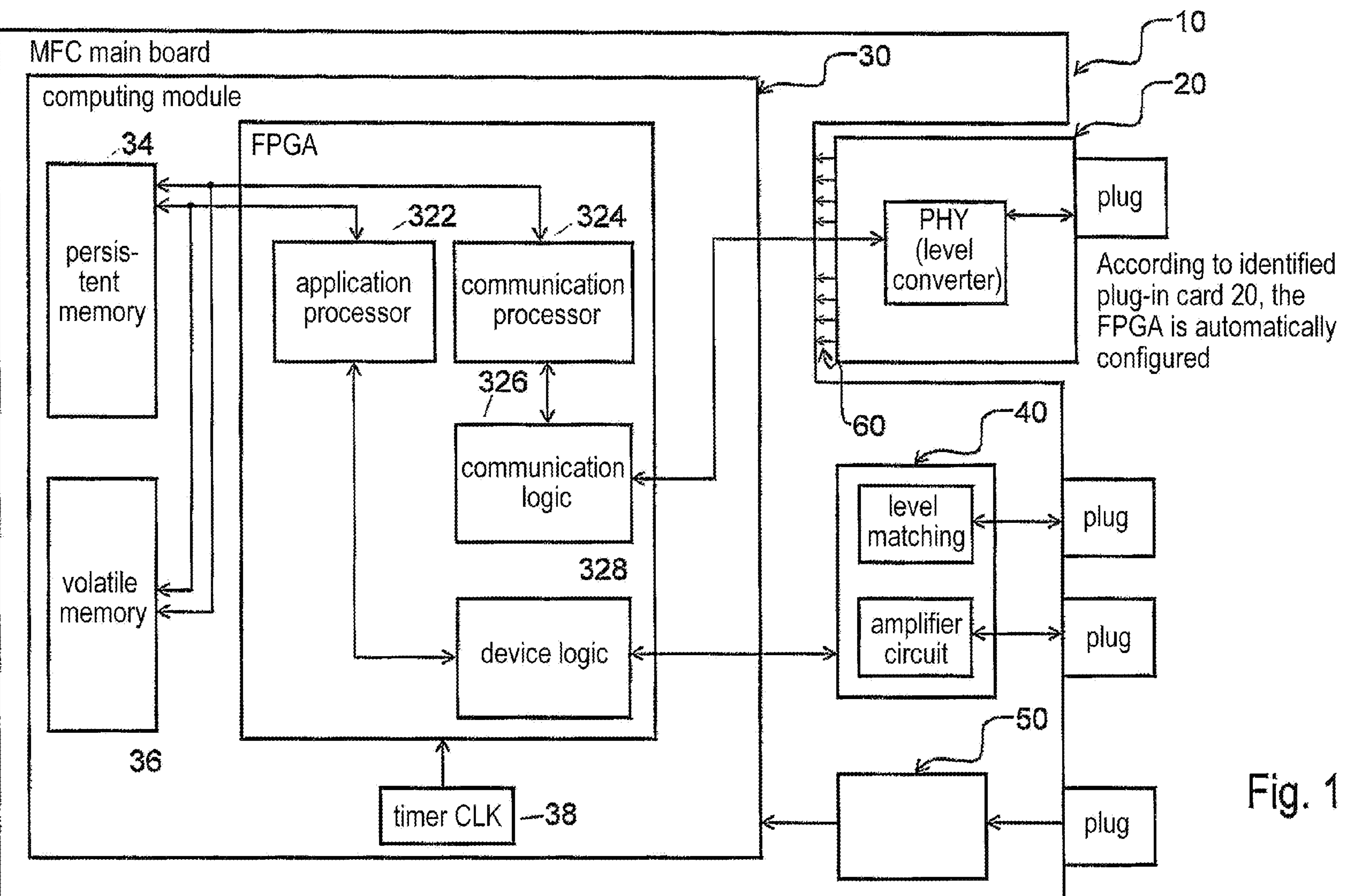
FIG. 1 is a schematic block diagram of a fluidic control unit with a universal computing module.

In FIG. 1, a circuit board 10 of a fluidic control unit is referred to as an "MFC main board". Therein, "MFC" signifies "mass flow controller", thus a mass flow control. This is an exemplary application of the invention. For incorporation in a communication environment, a communication module 20 pluggable into the circuit board 10 is provided. A computing module 30, standard interface components 40, and power supply components 50 are constructed on the circuit board 10. USB, Bluetooth, JTAG and the like with optionally required level matching or signal amplification as well as with their ports on the circuit board 10, which are symbolically referred to as "plugs", belong to the standard interface components 40. These standard interface components allow connection of external actuators and/or sensors, but can also be used for service and diagnosis. The power supply components 50 also have a connection to the environment referred to as a "plug" on the circuit board 10.

Furthermore, the circuit board 10 has a slot 60 for communication modules 20 to be fitted as required. These communication modules 20 are constructed on a plug-in card with a unitary connector fitting to the slot 60 of the circuit board 10 as well as with a port to the communication environment dictated by the respective communication standard, referred to as a "plug" in FIG. 1, although it can be any electrical, optical or HF communication port. Specifically, coding identifiable by the computing module 30 via the slot 60 and a PHY module, e.g. a level converter, can be provided on the plug-in card of the communication module 20. Details of the universal usability of the interface to very different communication modules are explained below with reference to FIG. 2.

All of the components requiring short signal propagation times are combined on the very compact computing module 30 designed as a unitary stock item. The computing module 30 only has simple conductive paths to the peripheral components such as the standard interface components 40, power supply components 50 and communication modules 20 in slot 60 on the circuit board 10 to the "outside environment".

The computing module 30 includes a programmable logic module (referred to as a FPGA module 32 (FIG. 2) in the following), a persistent memory 34, e.g. flash memory, a volatile memory 36, e.g. SDRAM, as well as a timer 38. The components shown inside the FPGA are an application processor 322, a communication processor 324, a communication logic 326, and a device logic 328. These components are generated by a boot operation yet to be described by a configuration file within the FPGA upon each switching on of the system.

The standard interface components 40 mentioned heretofore, are only examples. According to application, service and/or diagnosis interfaces are required, in particular USB, EIA 232, Ethernet or Bluetooth. For the connection of sensors and actuators, a further interface can be present, in particular SPI, UART, 4-20 mA input or output, $I^2C$ or 24 V driver. Furthermore, a human/machine interface can be provided, in particular a display, switch, key button, LED, audio or combination thereof.

Figure 2:
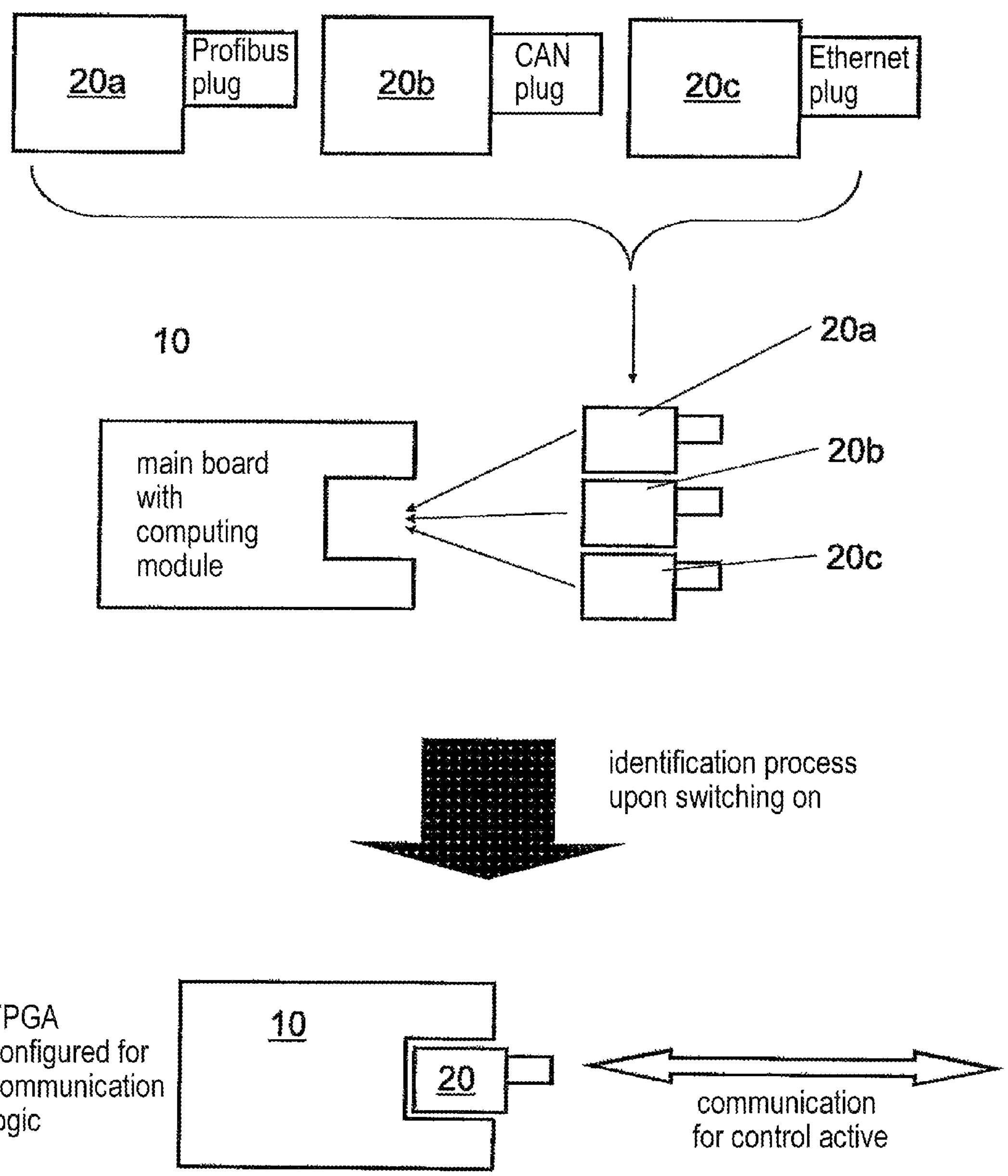
FIG. 2 is a diagram for illustrating the adaptation of the control unit to different communication environments.

FIG. 2 illustrates the possibilities of reconfiguration of the computing module for adaptation to the communication environment. For example, three different communication modules 20*a* for Profibus, 20*b* for CAN bus and 20*c* for Ethernet are shown. Each one of these modules is pluggable into the slot 60 of the circuit board 10. Preferably, the modules are digitally coded for identifying the respective type. For example, three of the conductors of the connector for slot 60 can transfer a digital code, by which eight (2^3) different module types can be coded. The computing module 30 can read out the respective codes upon switching on and correspondingly configure its hardware. This configuration operation can proceed completely automatically at the user or else—according to preference—only after enabling on the part of the manufacturer. After the identification process is completed and the FPGA is correspondingly configured, the control unit can be operated in the respective communication environment. Besides the examples shown in FIG. 2, of course, further field bus communication environments are possible, in particular Profibus, CANopen, Profinet or DART.

Figure 3:
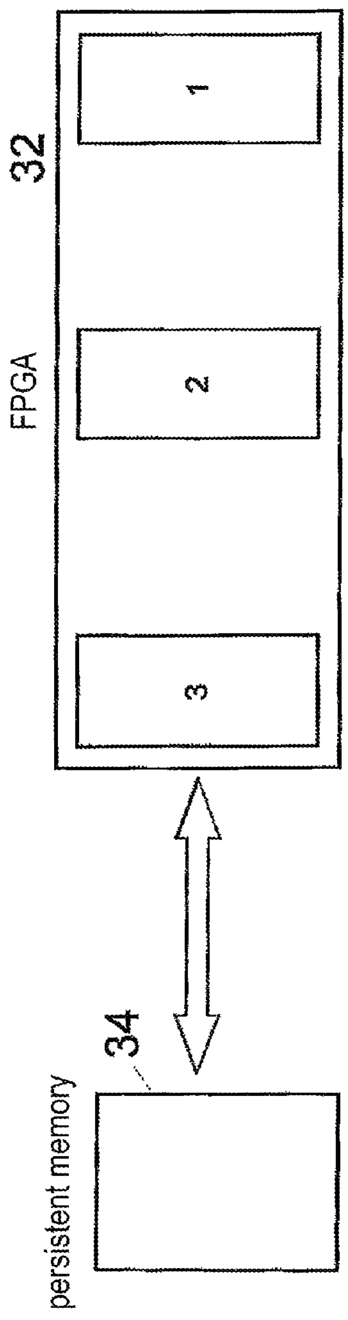

Upon each switching on, the computing module has the initial state represented in FIG. 3. The FPGA module 32 has a rudimentary hardware basic configuration including an instruction and variable memory 1 for the operating software, a CPU 2 and a memory controller 3. These components enable the system to read out and load a factory image at a fixed address of the persistent memory 34 upon switching on. The factory image determines the configuration procedure depending on the identified external hardware components with the aid of its operating software. To this, the factory image evaluates a boot configuration file stored in the persistent memory. Among other things, the boot configuration file contains the following information: Which application image is to be loaded; how many CPUs does the application image have; in which order the CPUs of the application image are to be booted; which software the individual CPUs are to execute; and at which addresses are the individual images.

Figure 4:
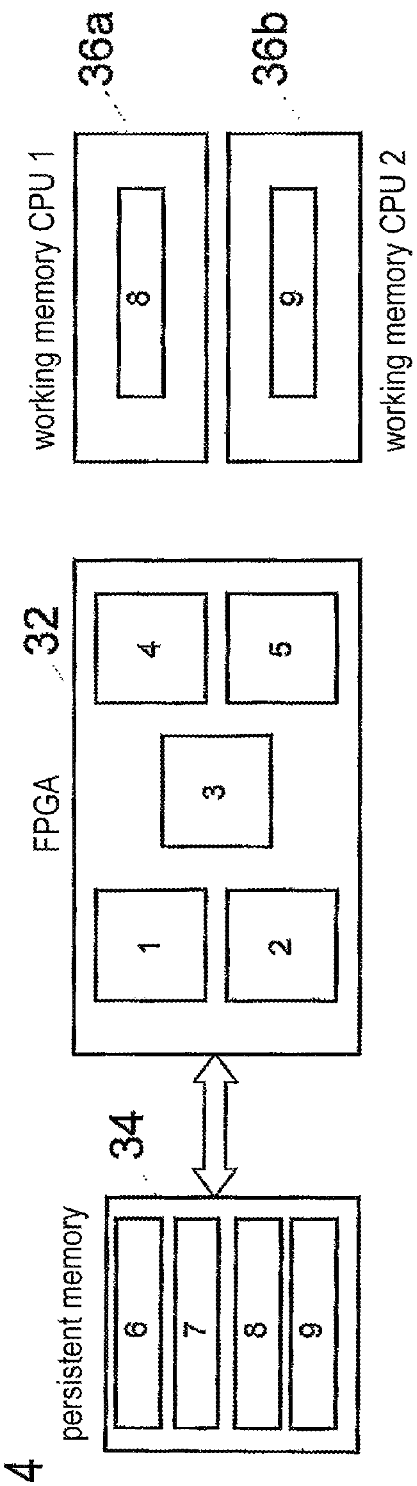
FIG. 4 shows the configured state of the computing module.

Subsequently, the FPGA 32 overwrites its initial configuration and reconfigures itself based on the information in the boot configuration file to a target system. In the example shown in FIG. 4, the target system has a RAM 1, a controller 2 for access to the persistent memory 34, a reset logic 3, a first CPU 4 and a second CPU 5. The first CPU 4 loads and processes the software "Bootcopier" 6, which is at the reset address of the CPU 4 in the persistent memory 34. In a "configuration direction" 7 in the persistent memory 34, an appropriate "software image" 8 is searched for, which is loaded into an area 36*a* of the volatile memory 36 reserved for the CPU 4. Now, the CPU 4 can execute its software and previously awakes the second CPU 5 via the reset logic 3. The second CPU 5 reads its "software image" 9 from the persistent memory 34 and copies it into its reserved area 36*b* of the volatile memory 36. The target system of the shown example is now completely configured.

In the embodiment shown in FIG. 1, the target system also has two CPUs, the first one of which is configured as an application processor 322 and the second one of which is configured as a communication processor 324. Further, the target system has the communication logic 326 matching the identified communication module 20 as well as the device logic 328 matching the required standard interface components 40.

Although a preferred embodiment of this invention has been disclosed, a worker of ordinary skill in this art would recognize that certain modifications would come within the scope of this invention. For that reason, the following claims should be studied to determine the true scope and content of this invention.

The invention claimed is:

1. A control unit for fluidic systems comprising:

a circuit board on which a computing module and at least one peripheral communication port connected to the circuit board via conductive paths are disposed, wherein the computing module implements hardware of the control unit;

the computing module includes a programmable logic module, a clock generator, a volatile fast working memory, and a persistent memory;

a factory image is stored in the persistent memory, which the programmable logic module loads at a switch-on moment;

a boot configuration file is stored in the persistent memory, which the programmable logic module reads out and evaluates with the factory image; and the programmable logic module configures programmable logic module hardware based on an evaluated boot configuration file or external signals, and loads applications for execution by the hardware into the volatile fast working memory, and wherein configuration of the programmable logic module is effected depending on communication participants connected to the at least one peripheral communication port of the circuit board.

2. The control unit according to claim 1, wherein the hardware of the programmable logic module configured with the boot configuration file includes an application processor, a communication processor, a communication logic, and a device logic.

3. The control unit according to claim 2, wherein the at least one peripheral communication port is a standard input and/or output port of a hardware interface, a digital part of which the programmable logic module implements.

4. The control unit according to claim 2, wherein the device logic includes a digital part of an interface to ports present on the circuit board for external devices such as actuators and sensors, wherein the interface has connectors, signal converters, and/or level converters on the circuit board.

5. The control unit according to claim 1, wherein the circuit board has a slot for an exchangeable communication module and communication modules for different communication environments, and including a unitary connector for the slot of the circuit board.

6. The control unit according to claim 1, wherein standard communication protocols are stored in the persistent memory and are made available by the programmable logic module depending on connected participants.

7. The control unit according to claim 1, wherein substantial contents are stored in the persistent memory in an encrypted manner.

8. The control unit according to claim 2, wherein a field bus, in particular Profibus, CANopen, Profinet or DART, is provided as the at least one peripheral communication port.

9. The control unit according to claim 1, wherein a service and/or diagnosis interface, in particular USB, EIA 232, Ethernet or Bluetooth, is provided as the at least one peripheral communication port.

10. The control unit according to claim 1, wherein a sensor and/or actuator interface, in particular SPI, UART, 4-20 mA input or output, $I^2C$ or 24 V driver, is provided as the at least one peripheral communication port.

11. The control unit according to claim 1, wherein a human/machine interface, in particular a display, switch, key button, LED, audio or combination thereof, is provided as the at least one peripheral communication port.

12. The control unit according to claim 1, wherein the computing module is a unitary stock item for various applications.

13. The control unit according to claim 1, wherein the circuit board is fitted with different interface components according to application as well as with a unitary computing module.

14. The control unit according to claim 1, wherein generating an output for at least one of a valve control, a metering control, an analysis, or a flow measurement.

15. A control unit for fluidic systems comprising:

a circuit board on which a computing module and at least one peripheral communication port connected to the circuit board via conductive paths are disposed, wherein the computing module implements hardware of the control unit;

the computing module includes a programmable logic module, a clock generator, a volatile fast working memory, and a persistent memory;

a factory image is stored in the persistent memory, which the programmable logic module loads at a switch-on moment;

a boot configuration file is stored in the persistent memory, which the programmable logic module reads out and evaluates with the factory image; and the programmable logic module reconfigures itself based on information in the boot configuration file or external signals, and loads applications for execution into the volatile fast working memory, and wherein configuration of the programmable logic module is effected depending on one or more communication modules being connected to the at least one peripheral communication port of the circuit board.

16. The control unit according to claim 15, wherein a dynamic configuration is provided by identification of communication modules connected to the circuit board, and wherein an existing configuration can be adapted to a varied communication environment at any time by a user by plugging the communication modules into the circuit board.

17. The control unit according to claim 15, wherein components of the programmable logic module are made available as hardware by programming.

18. The control unit according to claim 15, wherein the circuit board is a mass flow control main board for a fluidic system.

* * * * *